(12) United States Patent
Max et al.

(10) Patent No.: US 11,491,913 B2
(45) Date of Patent: Nov. 8, 2022

(54) METHOD FOR ACTIVATING AT LEAST ONE DEVICE FROM A TRANSPORTATION VEHICLE

(71) Applicant: VOLKSWAGEN AKTIENGESELLSCHAFT, Wolfsburg (DE)

(72) Inventors: Stephan Max, Gifhorn (DE); Kristian Weiss, Berlin (DE)

(73) Assignee: Volkswagen Aktiengesellschaft

( * ) Notice: Subject to any disclaimer, the term of this patent is extended or adjusted under 35 U.S.C. 154(b) by 478 days.

(21) Appl. No.: 16/614,844

(22) PCT Filed: May 15, 2018

(86) PCT No.: PCT/EP2018/062593
§ 371 (c)(1),
(2) Date: Nov. 19, 2019

(87) PCT Pub. No.: WO2018/219640
PCT Pub. Date: Dec. 6, 2018

(65) Prior Publication Data
US 2020/0108772 A1    Apr. 9, 2020

(30) Foreign Application Priority Data
May 31, 2017  (DE) .................. 10 2017 209 240.8

(51) Int. Cl.
*B60Q 9/00*   (2006.01)
*B60Q 1/08*   (2006.01)
(Continued)

(52) U.S. Cl.
CPC ............. *B60Q 9/008* (2013.01); *B60Q 1/085* (2013.01); *B60Q 5/006* (2013.01); *G08G 1/0112* (2013.01);
(Continued)

(58) Field of Classification Search
CPC .... B60Q 1/085; B60Q 5/006; B60Q 2300/05; B60Q 2300/056; B60Q 2300/332;
(Continued)

(56) References Cited

U.S. PATENT DOCUMENTS 9,718,405 B1 * 8/2017 Englander ............ G01S 13/931
9,925,980 B2 * 3/2018 Edo-Ros ............ B60T 8/17558
(Continued)

FOREIGN PATENT DOCUMENTS

CA        3111387 A1 * 9/2021 ............... B60Q 1/30
DE    102006057741 A1    9/2007
(Continued)

OTHER PUBLICATIONS

Search Report for International Patent Application No. PCT/EP2018/062593; dated Aug. 3, 2018.

*Primary Examiner* — Ojiako K Nwugo
(74) *Attorney, Agent, or Firm* — Barnes & Thornburg, LLP

(57) ABSTRACT

A method for activating at least one device from a transportation vehicle wherein the at least one device is activated by the transportation vehicle at least as a function of global position data of at least one pedestrian and/or at least one cyclist. The position data of the at least one pedestrian and/or the at least one cyclist is transmitted to a remotely located computer unit and is made available to a computer unit of the transportation vehicle. The activation of the at least one device as a function of the position data of pedestrians and/or cyclists is made possible in a simple and economic way.

13 Claims, 5 Drawing Sheets

(51) Int. Cl.
 *B60Q 5/00* (2006.01)
 *G08G 1/01* (2006.01)
 *G08G 1/16* (2006.01)

(52) U.S. Cl.
 CPC ............ *G08G 1/0129* (2013.01); *G08G 1/164* (2013.01); *G08G 1/166* (2013.01); *B60Q 2300/05* (2013.01); *B60Q 2300/056* (2013.01); *B60Q 2300/332* (2013.01); *B60Q 2300/45* (2013.01)

(58) Field of Classification Search
 CPC ............ B60Q 2300/45; G08G 1/0112; G08G 1/0129; G08G 1/164; G08G 1/166; G08G 1/005; G08G 1/0116; G08G 1/012; G08G 1/0133; G08G 1/0141; G08G 1/04
 See application file for complete search history.

(56) References Cited

U.S. PATENT DOCUMENTS

| | | |
|---|---|---|
| 2005/0073438 A1 | 4/2005 | Rodgers et al. |
| 2011/0199199 A1 | 8/2011 | Perkins |
| 2014/0051346 A1 | 2/2014 | Li et al. |
| 2014/0118128 A1* | 5/2014 | Orzeck ............ B62J 6/16 340/432 |
| 2016/0318437 A1 | 11/2016 | Vilakathara |
| 2018/0075747 A1* | 3/2018 | Pahwa ............ B60W 40/10 |
| 2018/0215378 A1* | 8/2018 | Edo Ros ............ B60T 8/17558 |
| 2020/0269875 A1* | 8/2020 | Wray ............ G05D 1/0088 |

FOREIGN PATENT DOCUMENTS

| | | | |
|---|---|---|---|
| DE | 102008049824 A1 | 4/2010 | |
| DE | 102010048470 A1 | 8/2011 | |
| DE | 102012210123 A1 | 12/2012 | |
| DE | 102014110958 A1 | 4/2015 | |
| DE | 102015004551 A1 | 10/2016 | |
| DE | 102015010932 A1 | 2/2017 | |
| DE | 102015214760 A1 | 2/2017 | |
| DE | 102017207968 A1 * | 6/2018 | ............ B60Q 1/525 |
| EP | 3112214 A1 | 1/2017 | |
| WO | 2016070193 A1 | 5/2016 | |

* cited by examiner

METHOD FOR ACTIVATING AT LEAST ONE DEVICE FROM A TRANSPORTATION VEHICLE

PRIORITY CLAIM

This patent application is a U.S. National Phase of International Patent Application No. PCT/EP2018/062593, filed 15 May 2018, which claims priority to German Patent Application No. 10 2017 209 240.8, filed 31 May 2017, the disclosures of which are incorporated herein by reference in their entireties.

SUMMARY

Illustrative embodiments relate to a method for the activation of at least one device by a transportation vehicle.

DETAILED DESCRIPTION

Figure 1:
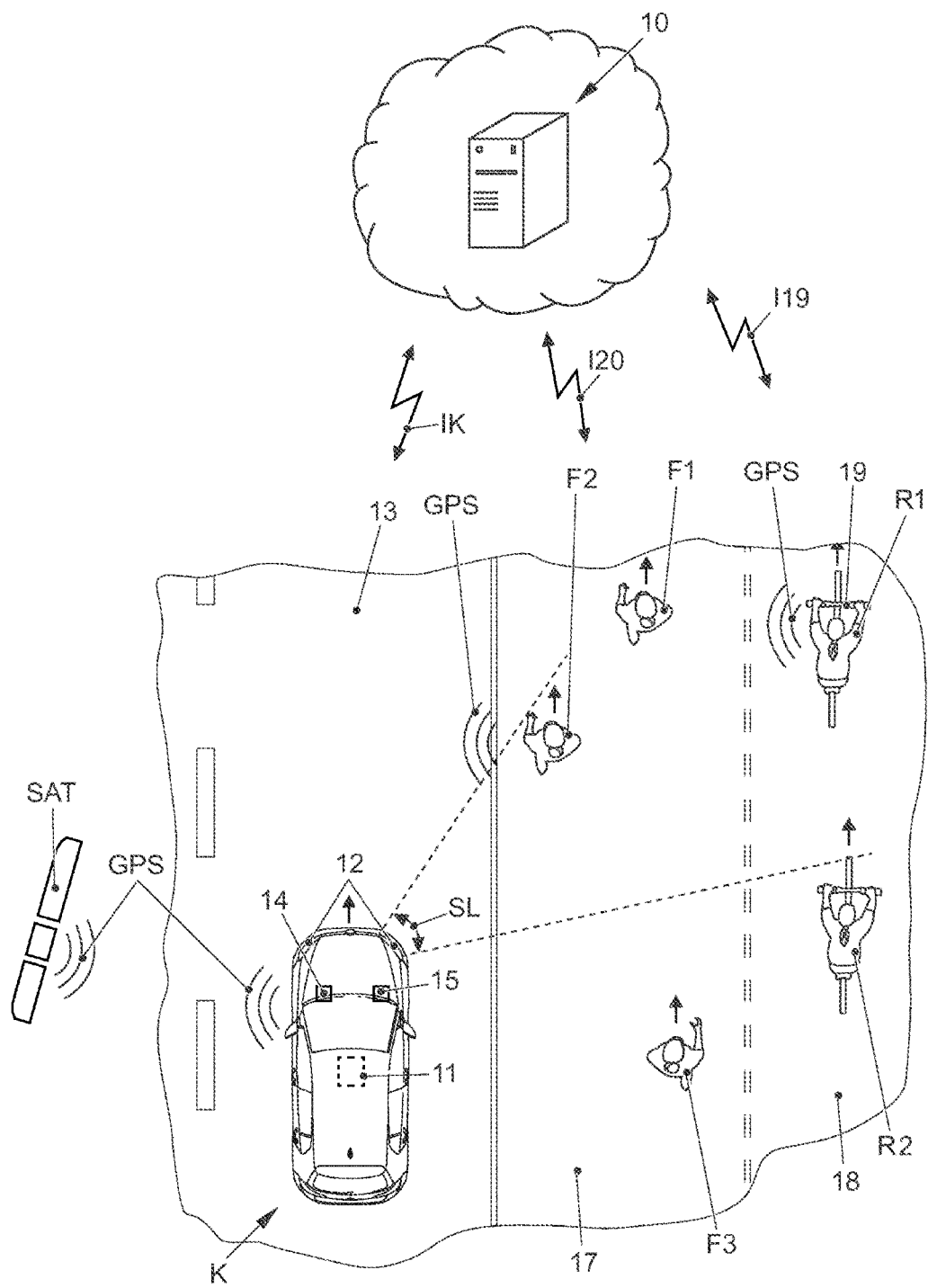
FIG. 1 shows the illustration of the method in a first embodiment.

Illustrative embodiments relate to a method for the activation of at least one device by a transportation vehicle.

Such a method has been disclosed by DE 10 2014 110 958 A1. This document specifically describes a transportation vehicle-pedestrian communication system. The system is used to warn operators respectively using an apparatus of the system. In this case, a first apparatus is carried and operated by a pedestrian. A second apparatus is installed in a transportation vehicle and able to be operated by a driver. The system is designed to output a warning to the driver and/or the pedestrian by way of the first apparatus and/or the second apparatus. A warning is output when it has been established, on the basis of recorded parameters such as global position and/or speed, that the provisional path of the transportation vehicle and the provisional path of the pedestrian intersect. It is described inter alia that the headlights are able to be directed onto a detected pedestrian. It is also mentioned to switch the headlights to high beam and to sound the horn when it is detected that the pedestrian is distracted. Optical and/or acoustic warnings may likewise be output to the driver via a human-machine interface (HMI).

DE 10 2010 048 470 A1 likewise discloses a transportation vehicle-pedestrian communication system. In this case, a transportation vehicle-based device for receiving and transmitting the global positioning of the transportation vehicle and a pedestrian-based device for receiving and transmitting a global position of the pedestrian are present. The transportation vehicle and/or the pedestrian are/is given an alarm signal that indicates to the one traffic participant, based on the respective global position data, the respective presence of the other traffic participant. It is also proposed, when detecting a pedestrian, to move pivotable headlights of the transportation vehicle in the horizontal and/or vertical direction to target and illuminate the pedestrian.

One common feature of the abovementioned systems is that they require a specific communication device that is coordinated between the pedestrian and the transportation vehicle. This is connected with additional costs and a requirement for widespread distribution of the specific communication devices, which calls into question the general practicality of the proposals.

The general prior art also discloses using headlights as a marking light for pedestrian protection purposes. In this case, a camera is used to detect a pedestrian and to mark or illuminate the pedestrian with a spotlight. Frequently occurring camera problems (for example, detection range, covering and weathering problems) are however problematic here.

Starting from the prior art, the disclosed embodiments provide a method for the activation of at least one device by a transportation vehicle that is able to be performed without particular special equipment, and therefore inexpensively.

The disclosed embodiments are based on a method for the activation of at least one device by a transportation vehicle, in which the at least one device is activated at least depending on recorded global position data of at least one pedestrian and/or of at least one cyclist. The global position data may be data of a GPS system (GPS=global positioning system).

It is proposed according to the disclosed embodiments for the position data of the at least one pedestrian and/or of the at least one cyclist to be recorded, transmitted to a remote (central) computer unit and provided to a computer unit of the transportation vehicle.

In contrast to the prior art, in the disclosed method there is thus no direct communication between an apparatus used by the pedestrian or cyclist and the transportation vehicle, but rather recorded global position data are initially "buffer-stored" in a remote computer unit (what is known as a cloud computer) and prepared before they are retrieved by a computer unit of a transportation vehicle or provided thereto.

The method thus uses generally available Internet techniques and dispenses with the requirement for special equipment, in particular, equipment that allows transportation vehicle-pedestrian communication.

The global position data of a pedestrian and/or of a cyclist may be recorded, for example, using a conventional Internet-capable and GPS-capable smartphone.

It is however also conceivable for global position data not to be recorded by apparatuses that are carried by a pedestrian or cyclist. It is also conceivable to record global position data of a pedestrian or cyclist using apparatuses that are installed in a stationary manner, separately from such individuals. It is conceivable, for example, to record position data using suitable cameras at road crossings. Such cameras, upon detecting individuals, may activate a GPS unit connected in terms of signaling, which for its part transmits a GPS signal of the camera position to the remote computer unit.

According to a first development of the method, the at least one device is a lighting device, a display device or an acoustic warning device of the transportation vehicle. It is thus easily made possible to activate devices of the transportation vehicle that are able to inform a driver about the presence of hazards or make possible collision objects visible.

According to another disclosed embodiment, position data from a multiplicity of pedestrians and/or cyclists are compiled in the remote computer unit over a defined period of time. The period of time may be, for example, one day. It is also conceivable to extend the period of time over a whole year or longer. A location-dependent and time-dependent stopping history (probability of stopping) of pedestrians and/or cyclists may then be formed from the compiled data.

The major benefit of this development is that there is no reliance at all upon recording and forwarding position data of a specific pedestrian or cyclist in real time. Rather, the compiled data, after being downloaded by the computer unit of the transportation vehicle, may be used to be able to activate the at least one device from the transportation vehicle as required, at least with a statistically high probability even without real-time recording.

According to at least one disclosed embodiment, it is thus conceivable, for example, for the compiled position data to be used to activate a city light generated by a lighting device of the transportation vehicle such that the city light is switched on in the area with a statistically high volume of pedestrians and/or cyclists. Sidewalks and/or cycling lanes may thus, for example, be illuminated further by a switched-on city light at particular locations and at particular times to make cyclists or pedestrians visible earlier.

Another disclosed embodiment proposes for the compiled position data to be used to activate a high beam generated by a lighting device of the transportation vehicle such that a high beam distribution, in areas with a statistically high volume of pedestrians and/or cyclists, only reaches a certain elevation that lies below a maximum elevation, able to be achieved by the high beam, of a high beam distribution normally able to be generated. As a result, possible dazzling of these traffic participants is able to be effectively prevented, on the one hand, and detectability thereof is nevertheless able to be improved, on the other hand.

If position and direction data of a pedestrian and/or of a cyclist are recorded and forwarded in real time, then it appears expedient for these data to be used by the transportation vehicle to direct a city light distribution onto that side of a roadway on which the pedestrian or the cyclist is also actually situated.

City light is understood to mean such a configuration of modern headlights in which, by distributing and increasing the symmetry of the light cone, improved lighting of sidewalks or cycling lanes is able to be achieved.

The situation may however also occur in which it is known that the position data are recorded or are able to be recorded only with significant inaccuracy. This may be estimated, for example, on the basis of a poor or weak GPS signal. In such a case, it is then highly expedient for the city light to be directed onto both sides of the roadway. Inaccurate position data are then at least partly able to be compensated.

Light assistants known in the prior art use a camera to dim a switched-on high beam on the basis of detected front headlights or tail lights of other transportation vehicles, and thus to avoid dazzling the other traffic participants. Such a procedure is not possible in the case of pedestrians and possible only to a very limited extent in the case of cyclists, since pedestrians are difficult to detect when it is dark and the lighting in the case of cyclists is not as bright as in the case of transportation vehicles. It is therefore conceivable, according to another disclosed embodiment, for the position data of the at least one pedestrian and/or of the at least one cyclist to be used by the transportation vehicle to mask a high beam distribution from the pedestrian or cyclist.

To improve the quality of the position data, according to another disclosed embodiment, it is proposed to compare the position data using a navigation map. If, for example, an object moves in the vicinity of the transportation vehicle and also in the same movement direction and if position data are displayed outside a known right-hand side sidewalk or cycling lane, then a correction of the position of the object onto the sidewalk or cycling lane is applied with high probability.

Such a comparison, which is also called map matching, may be performed by the central computer unit or else by the local computer unit in the transportation vehicle.

According to another development, it is finally also additionally proposed for relative movement data also to be recorded in addition to the absolute position data and to be used to estimate an expected movement trajectory of the at least one pedestrian and/or of the at least one cyclist. If the movement trajectory of the transportation vehicle and that of the pedestrian or cyclist intersect, then an optical and/or acoustic warning may be given by the transportation vehicle to the transportation vehicle driver and/or the pedestrian or cyclist.

Finally, the disclosure is also intended to claim protection for a transportation vehicle by way of which the disclosed method is able to be performed. A transportation vehicle configured in this way has at least one lighting device and/or at least one display device as well as at least one local computer unit fixedly installed in the transportation vehicle. An Internet interface for communication of the local computer unit with at least one remote computer unit (cloud computer) is also present. Global position data of at least one pedestrian and/or of at least one cyclist are able to be downloaded from the remote computer unit, or these data are downloaded, by the local computer unit. The local computer unit is furthermore connected to at least one control unit for the activation of the at least one lighting device and/or the at least one display device by the transportation vehicle. This is performed such that the lighting device is able to be activated or is activated depending on downloaded global position data of at least one pedestrian and/or of at least one cyclist.

Exemplary embodiments are illustrated in the figures and are explained in more detail in the following description with reference to the figures. Even more benefits also thereby become apparent. Identical reference signs, even in different figures, relate to identical, comparable or functionally identical components. In this case, corresponding or comparable properties and benefits are achieved, even without a repeated description or reference thereto. The figures are not always true to scale. In some figures, proportions may be illustrated in exaggerated form to be able to highlight features of an exemplary embodiment more clearly.

Reference is made initially to FIG. 1. This figure shows a transportation vehicle K that is moving in a travel direction (cf. arrow) on a roadway 13. A sidewalk 17 and a cycling lane 18 are present on the right next to the roadway 13.

Pedestrians F1 to F3 are walking on the sidewalk 17 and two cyclists R1 and R2 are traveling in the cycling lane 18. The arrows in each case indicate the movement direction or travel direction.

The transportation vehicle K has a local computer unit 11 as well as an Internet interface 15 and a GPS device 14. The transportation vehicle K is capable, via the Internet interface 15, of establishing an Internet connection IK with a remote computer unit 10 (cloud computer). The transportation vehicle K is able to exchange GPS signals GPS with a plurality of satellites SAT (only one is illustrated) via the GPS device 14.

One of the pedestrians, specifically the pedestrian F2, is carrying a GPS device 20, such as, a conventional smartphone. The cyclist R1 is likewise carrying a GPS device 19, such as, a conventional smartphone.

The pedestrian F2 and the cyclist R1 are thus capable of exchanging GPS signals GPS with satellites SAT and of establishing Internet connections I20, respectively I19, with the remote computer unit 10.

The cyclist R1 and the pedestrian F2 constantly send their recorded global position data to the remote computer unit 10 via the Internet connections I19 and I20.

The Internet connection IK serves such that the recorded position data are able to be transmitted from the computer unit 10 to the local computer unit 11 of the transportation vehicle K and thus be provided to the transportation vehicle K.

The computer unit 11 evaluates the position data and uses them to accordingly activate a lighting device 12, such as, headlights, according to need and situation.

In the specific case, the lighting device 12 is activated such that a city light distribution SL is directed onto that side of the roadway 13 where pedestrians and/or cyclists are actually situated.

The city light distribution SL is thus directed in the direction of the sidewalk 17 and of the cycling lane 18, and thus illuminates the pedestrians and cyclists situated there.

There is thus no direct communication between the pedestrian F2 and the transportation vehicle K or the cyclist R1 and the transportation vehicle K. The communication of the position data from the pedestrian F2 or from the cyclist R1 thus takes place exclusively via the remote computer unit 10.

The method thus has the benefit that neither the transportation vehicle K nor the pedestrian F2 nor the cyclist R1 require special equipment for their global position data to be able to be provided to the transportation vehicle K and for the transportation vehicle K to be able to activate its lighting device 12 accordingly.

Figure 2:
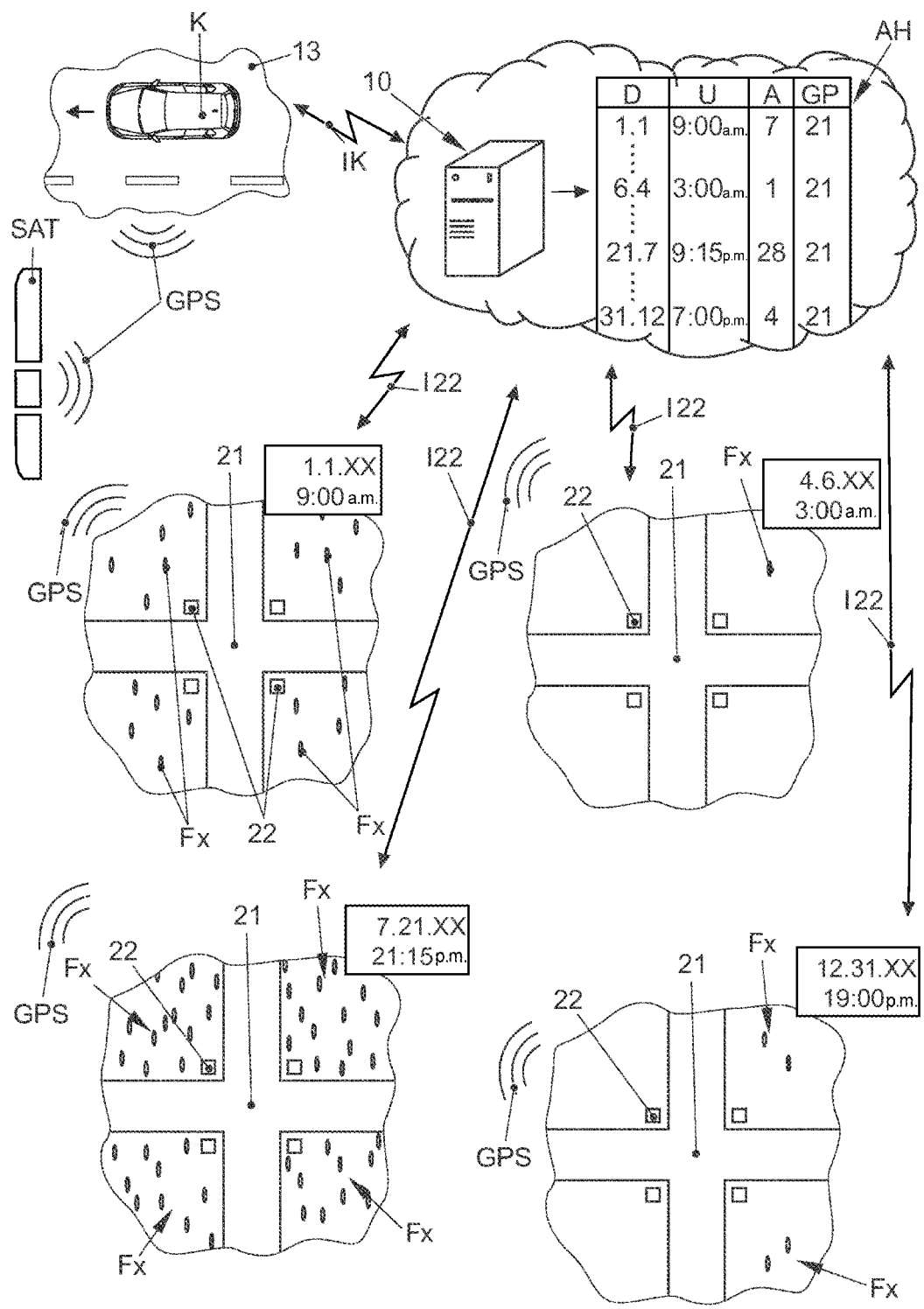
FIG. 2 shows the illustration of the method in a second embodiment.

One exemplary embodiment of the method is now illustrated with reference to FIG. 2. In contrast to the first exemplary embodiment, in this case global position data from a multiplicity of pedestrians and/or cyclists are compiled in the remote computer unit 10 over a defined period of time or a period of time to be defined. A location-dependent and time-dependent stopping history (probability of stopping) is calculated from these data.

A road crossing 21 is thus visible at various times extending over a year. Camera systems 22 are fixedly installed in the area of the road crossing 21, which camera systems have a GPS device and are connected to an Internet interface (not illustrated in more detail).

The camera systems 22 are able to exchange GPS data GPS with satellites SAT via the GPS device. An Internet connection I22 between the camera systems 22 and the computer unit 10 is able to be established via the Internet interface.

If pedestrians Fx are recorded in the area of the road crossing 21 at a defined time by way of the camera systems 22, then the number A of recorded pedestrians Fx, together with the date D, the time U and the global position data GP of the camera systems 22, and therefore more or less of the road crossing 21, is transmitted to the computer unit 10. The computer unit stores these data in a dedicated memory and forms a stopping history AH for the immediate surrounding area of the road crossing 21.

The same method may accordingly be applied to any other desired locations or areas. The benefit is that pedestrians and/or cyclists situated in such a recorded area such as the road crossing 21 do not require any additional special equipment whatsoever, not even a conventional smartphone.

It is thus, for example, stored in the stopping history AH that seven pedestrians Fx were situated in the area of the road crossing 21 on 01.01.XX at 9.00 a.m. Only one pedestrian was recorded on 04.06.XX at 3.00 a.m. By contrast, twenty-eight pedestrians Fx stopped in the area of the road crossing 21 on 07.21.XX at 9.15 p.m. There were only four on 12.31.XX at 7.00 p.m.

The stopping history AH may be provided by the computer unit 10 to the transportation vehicle K via an Internet connection IK. The transportation vehicle K may then use these data to display a map display on a dedicated display unit belonging to the transportation vehicle when required, in which map display time-based stopping probabilities of pedestrians and/or cyclists are depicted (this is shown again elsewhere).

Figure 3:
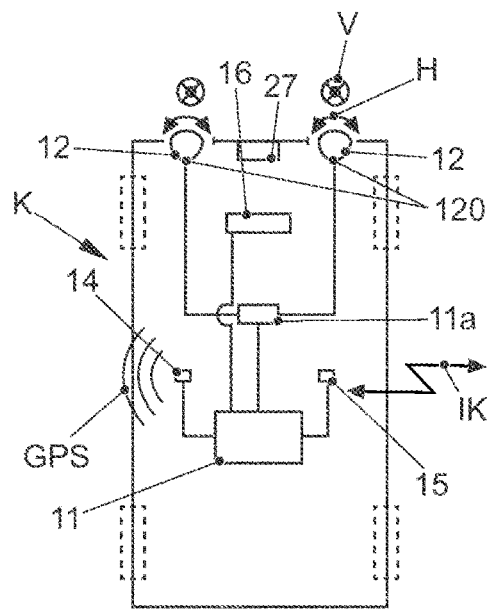
FIG. 3 shows the illustration of a transportation vehicle for performing the method.

With reference to FIG. 3, the transportation vehicle K configured for the disclosed method is now intended to be illustrated once more in slightly more detail.

The local computer unit 11 is thus connected in terms of signaling to the GPS device 14 and to the Internet interface 15. The Internet connection IK of the transportation vehicle K to the remote computer unit 10 is able to be established via the Internet interface 15. The recorded data available to the computer unit 11 are used to generate corresponding control signals, in a control unit 11*a*, for activating the lighting device 12. The lighting device 12 consists of two headlights that are able to be pivoted, via pivot points 120, both in a horizontal direction H and in a vertical direction V.

A display device 16, which may be designed, for example, as a display or operable touchscreen, allows a driver, when required, to be shown a navigation map that displays, for example, a stopping history or a stopping probability of pedestrians and/or cyclists for the area through which he is currently traveling. An acoustic device 27, such as, a signaling horn, is also present.

The devices 12, 16 and 27 as well as the computer unit 11, the control unit 11*a* and the GPS device 14 are fixedly installed in the transportation vehicle K, that is to say are components of the transportation vehicle K.

Figure 4A:
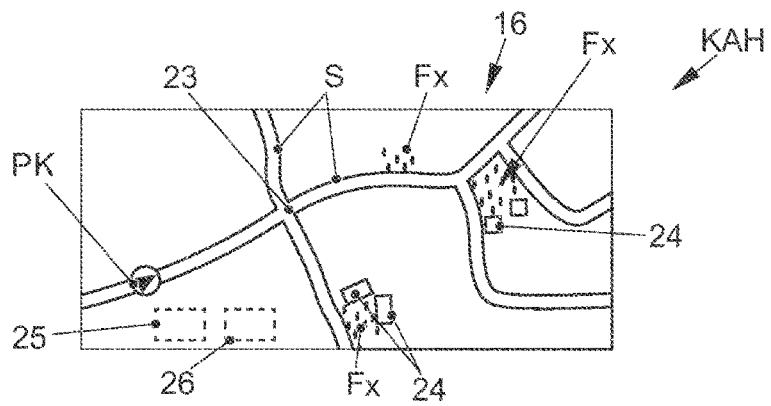
FIGS. 4a-b show the illustration of a navigation map in various modes of the method.

FIG. 4*a* thus shows a navigation map KAH having a stopping history. The current position PK of the transportation vehicle K on roads S is displayed therein. The transportation vehicle K is moving onto a road crossing 23. Buildings are indicated by 24. Also depicted are pedestrians Fx, who are situated at defined positions on the navigation map KAH (according to experience) at the travel time of the transportation vehicle K on the basis of the transmitted stopping history AH.

Figure 4B:
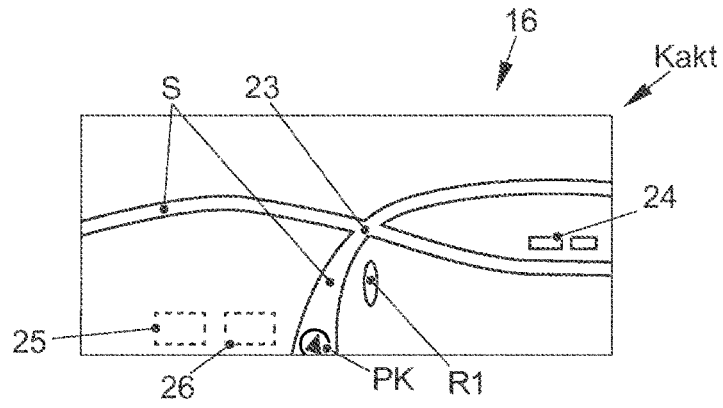

At 25 and 26, soft keys are provided to the driver, using which the driver is able to return to a main menu, not illustrated, or is able to change to such a map display, as is illustrated in FIG. 4*b*. This figure illustrates a current navigation map Kakt in which currently recorded cyclists/pedestrians are visible. These are thus recorded specifically and promptly in accordance with the method option (FIG. 1) illustrated at the beginning. It is apparent that just one cyclist R1 has been recorded here. The lighting device of the transportation vehicle K is able to be activated correspondingly so as not to dazzle but nevertheless to illuminate the cyclist R1.

It is incidentally conceivable for the type of activation of the lighting device 12 by the transportation vehicle K to change automatically depending on the navigation map (KAH or Kakt) selected by the transportation vehicle driver. When displaying the navigation map KAH, the lighting device 12 is thus activated generally on the basis of experiential values. When choosing the navigation map Kakt, by contrast, the lighting device 12 is activated on the basis of promptly received position data from moving objects that are actually present in the region of the transportation vehicle K. It is also conceivable for the display device 16 to be activated depending on actually recorded pedestrians or cyclists such that there is a change, from any display on the display device 16, to a display according to FIG. 4b. This may be additionally connected with an acoustic or optical warning signal.

As already mentioned, it is conceivable for the compiled position data stored in an order history to be able to be used to activate a high beam such that the high beam only shines up to a defined maximum elevation in areas with a statistically high volume of pedestrians and/or cyclists.

Figure 5:
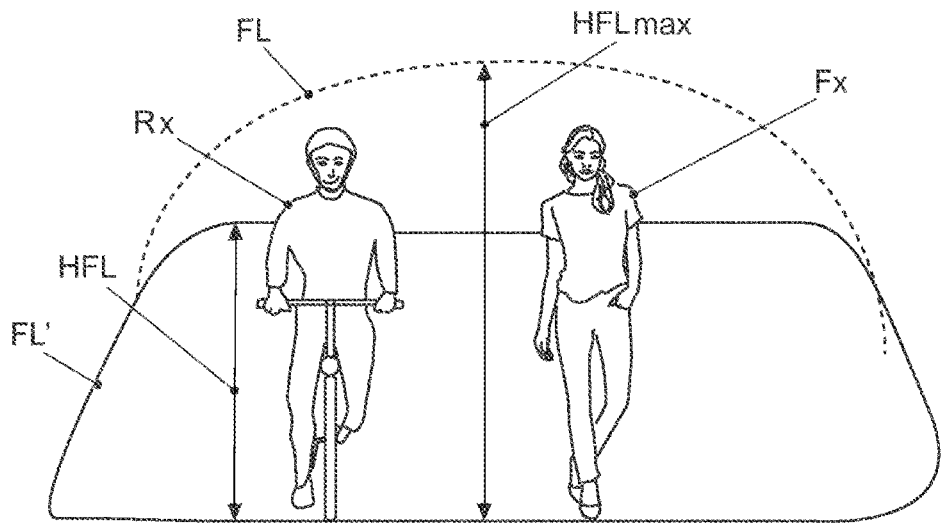
FIG. 5 shows the illustration of a high beam distribution in the case of a spatially and temporally statistically high volume of pedestrians and/or cyclists.

This is illustrated in FIG. 5. In this case, a conventional high beam distribution FL, as is able to be generated or is generated under normal conditions with little risk of dazzling (for example, on highways), is illustrated in dashed form. FL' denotes such a high beam distribution as is able to be generated or is generated in areas with a statistically high volume of pedestrians Fx or cyclists Rx. It is apparent that the high beam distribution FL has a maximum elevation HFL max that is situated well above the heads of the cyclists Rx and Fx, and may thus dazzle them. An elevation HFL of the high beam distribution FL', on the other hand, is situated below the heads of the cyclists Rx and pedestrians Fx. The risk of dazzling is thus able to be avoided.

Figure 6:
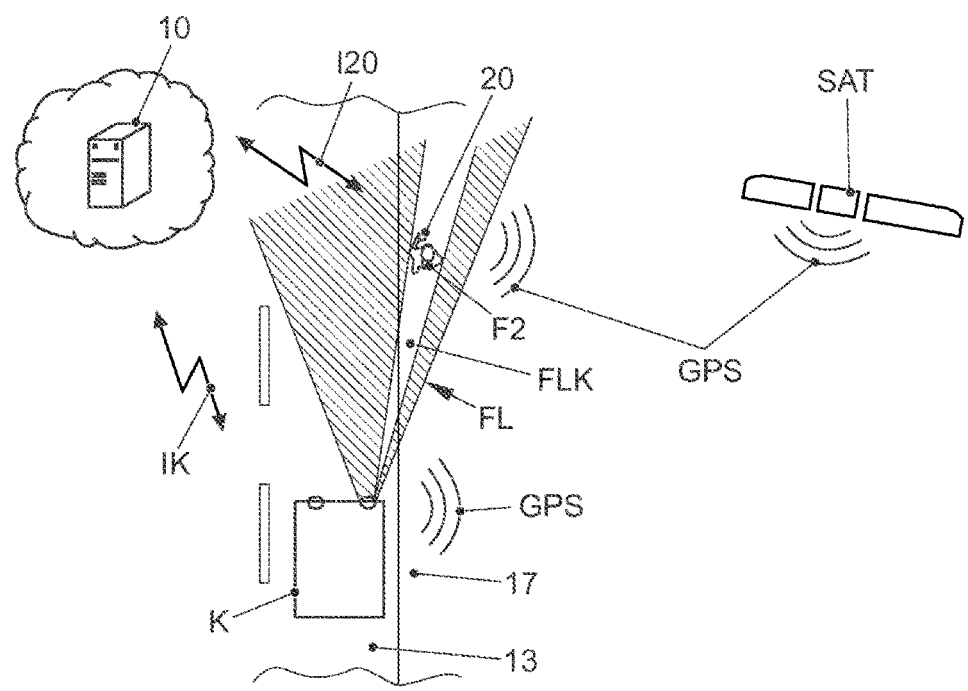
FIG. 6 shows the illustration of a masked high beam in connection with the method.

FIG. 6 shows one configuration of the method in which a pedestrian F2 is again equipped with a GPS device 20, such as, a smartphone. By way of this, global position data of the pedestrian F2 are able to be recorded promptly via GPS signals GPS and transmitted to the remote computer unit 10 via the Internet connection I20 of the smartphone. The global position data of the pedestrian F2 may be provided to the transportation vehicle K again via the Internet connection IK. In response, the transportation vehicle K activates its lighting device 12 such that, in the case of a high beam distribution FL, a light-free high beam corridor FLK is generated for the pedestrian F2. The high beam distribution FL is thus masked in the region of the pedestrian F2.

Figure 7:
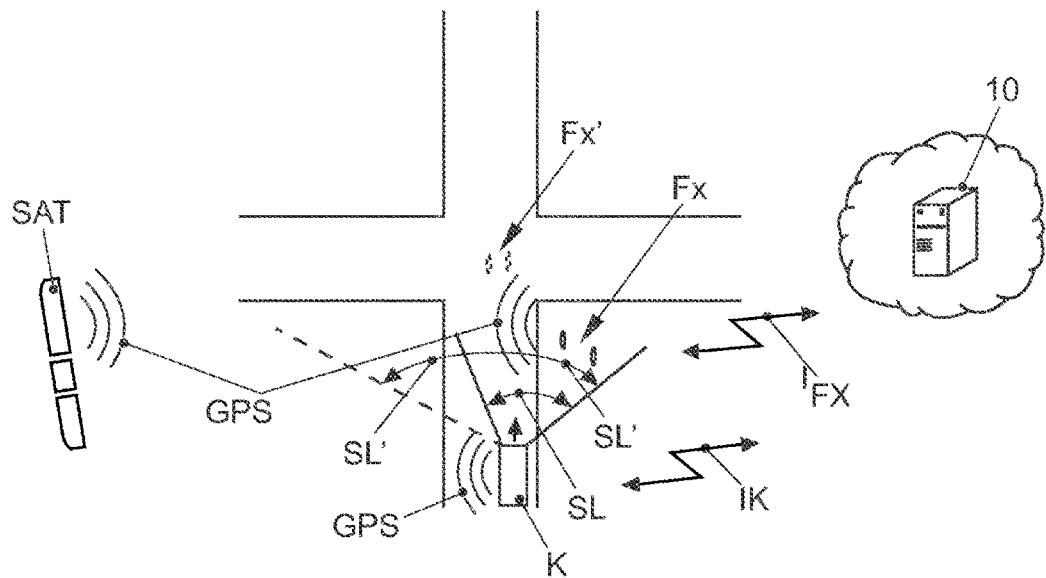
FIG. 7 shows the illustration of two different city light distributions based on the quality of received GPS signals.

FIG. 7 illustrates how a city light distribution SL may also be varied depending on specifically present pedestrians. The pedestrians Fx are thus again carrying smartphones, not illustrated in more detail, such that their global positions are able to be recorded and these are able to be transmitted to a computer unit 10 via an Internet connection IFX. The global position data of the pedestrians Fx may again be provided by the computer unit 10 to the transportation vehicle K via an Internet connection IK. Since the position data indicate to the transportation vehicle K that the pedestrians Fx are situated on the right-hand side of the roadway, the city light distribution SL is directed onto the right-hand side of the roadway.

It may however also be the case that it is detected that the supplied position data of the pedestrians Fx are of poor quality. This is intended to be indicated by Fx'. In such a case, it is expedient for a city light distribution SL' that is directed onto both sides of the roadway to be generated. It is thus able to be ensured that the pedestrians Fx in the region of the transportation vehicle K are illuminated with a high probability, in spite of the poor quality of the GPS signals GPS.

Figure 8:
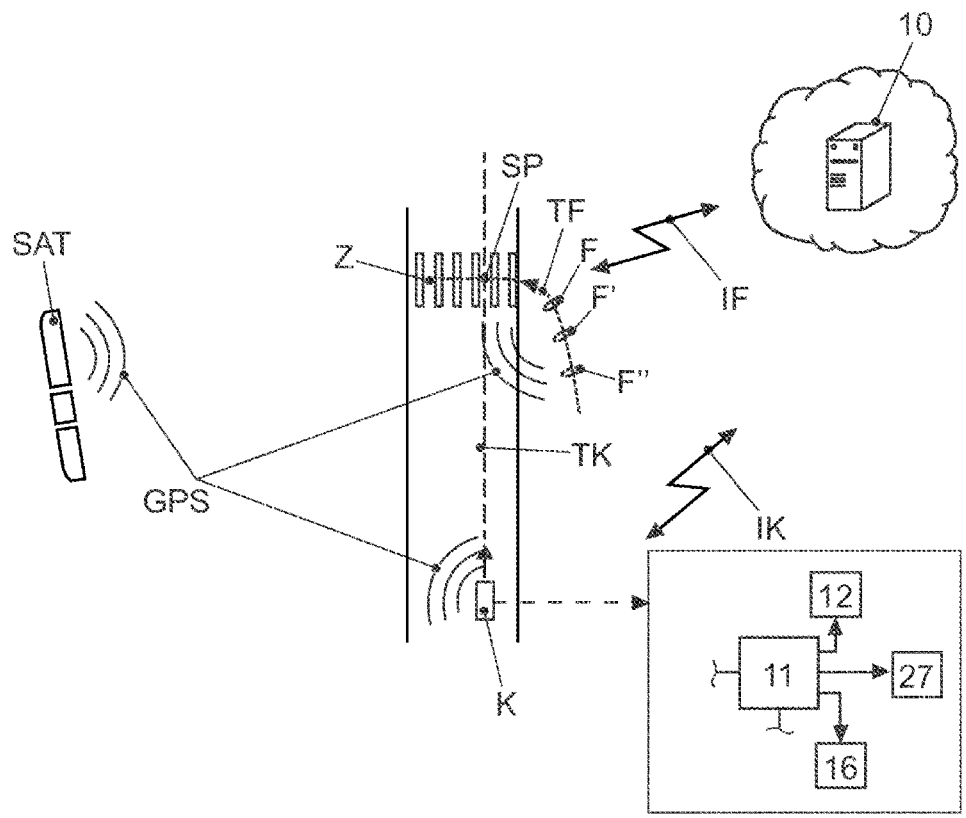
FIG. 8 shows the outputting of warnings to the driver and/or the pedestrian when the movement trajectories of the transportation vehicle and pedestrian intersect.

Finally, FIG. 8 illustrates an illustrative embodiment of the method, in which a pedestrian F is again carrying a smartphone, not illustrated in more detail, and both global position data and movement data of the pedestrian F are transmitted to the remote computer unit 10 via an Internet connection IF. The reference signs F' an F''' indicate positions of the pedestrian F that the pedestrian occupied a short time previously. The position data and movement data of the pedestrian F are again provided to the transportation vehicle K via an Internet connection IK. The computer unit 11, by way of a suitable logic unit, estimates a movement trajectory TF of the pedestrian from these data, which movement trajectory in this case passes over a pedestrian crossing Z. The computer unit 11 likewise knows a movement trajectory TK of the transportation vehicle K. It is able to be calculated from this whether a point of intersection SP between the movement trajectories TF and TK occurs and whether there is thus a risk of collision.

In such a case, the lighting device 12, the acoustic device 27, such as, a signaling horn (cf. FIG. 3), and the display device 16 may be activated by the computer unit 11 such that an optical and/or acoustic warning is given both to the pedestrian F and to the driver of the transportation vehicle K. The warning may also be given as a text and/or speech output. It is also conceivable for an acoustic device additionally situated in the interior of the transportation vehicle K (for example, a speaker) to be activated such that an acoustic warning is (also) given thereby.

LIST OF REFERENCE SIGNS

10 Remote computer unit (cloud computer)
11 Local computer unit of the transportation vehicle
11a Control unit
12 Lighting device
13 Roadway
14 GPS device
15 Internet interface
16 Display device
17 Sidewalk
18 Cycling lane
19 GPS device; smartphone
20 GPS device; smartphone
21 Road crossing
22 Camera systems having GPS and Internet access
23 Road crossing
24 Building
25 Soft key
26 Soft key
27 Acoustic device
120 Pivot point
A Number
AH Stopping history
D Date
F Pedestrians
F, F', F''' Pedestrians
F1-F3 Pedestrians
FL, FL' High beam distribution
FLK Light-free high beam corridor
Fx, Fx' Pedestrians (indeterminate number)
GPS GPS Signals
GP Global position data GP21 Global position data of the road crossing
H Horizontal direction
HFL Elevation of the high beam distribution
HFL max Maximum achievable elevation of the high beam distribution
IF Internet connection
IFX Internet connection
IK Internet connection of the transportation vehicle
I19 Internet connection of the device of a cyclist
I20 Internet connection of the device of a pedestrian
I22 Internet connection of camera systems
K Transportation vehicle
KAH Navigation map containing stopping history
Kakt Current navigation map containing currently recorded cyclists/pedestrians
PK Current position of the transportation vehicle
R1, R2 Cyclists
Rx Cyclists (indeterminate number)
S Roads
SAT Satellites
SL, SL' City light distribution
SP Point of intersection
TF Movement trajectory
TK Movement trajectory
U Time
V Vertical direction
Z Pedestrian crossing

The invention claimed is:

1. A method for activation of at least one device by a transportation vehicle, wherein the at least one device is activated at least based on recorded global position data of at least one pedestrian and/or of at least one cyclist, wherein the position data of the at least one pedestrian and/or of the at least one cyclist are recorded, transmitted to a remote computer unit and provided to a computer unit of the transportation vehicle,
   wherein the at least one device is a lighting device, a display device or an acoustic device of the motor transportation vehicle,
   wherein position data from a multiplicity of pedestrians and/or cyclists are compiled in the remote computer unit and a location-dependent and time-dependent stopping history of pedestrians and/or cyclists is formed from these data.

2. The method of claim 1, wherein the compiled position data are used to activate a city light such that the city light is switched on in areas with a statistically high volume of pedestrians and/or cyclists.

3. The method of claim 1, wherein the compiled position data are used to activate a high beam such that a generated high beam distribution, in areas with a statistically high volume of pedestrians and/or cyclists, only reaches a certain elevation that lies below a maximum elevation, able to be achieved by the high beam, of a high beam distribution normally able to be generated.

4. The method of claim 1, wherein position and movement data of the at least one pedestrian and/or of the at least one cyclist are used by the transportation vehicle to direct a city light distribution onto that side of a roadway on which the pedestrian or the cyclist is situated.

5. The method of claim 4, wherein the city light distribution is directed onto both sides of the roadway in response to detecting that the position data are based on a poor or weak GPS signal.

6. The method of claim 4, wherein the position data of the at least one pedestrian and/or of the at least one cyclist are used by the transportation vehicle to mask a high beam distribution from the pedestrian or cyclist.

7. The method of claim 4, wherein the position data are compared using a navigation map.

8. The method of claim 4, wherein movement data are also recorded in addition to the position data and are used to estimate an expected movement trajectory of the at least one pedestrian and/or of the at least one cyclist, and a warning notification is output to the transportation vehicle driver and the at least one pedestrian or cyclist in response to it being expected that the movement trajectory of the at least one pedestrian and/or cyclist intersects a movement trajectory of the transportation vehicle.

9. A transportation vehicle for performing for activation of at least one device by the transportation vehicle, the transportation vehicle comprising:
   at least one lighting device and/or at least one display device;
   at least one local computer unit situated in the transportation vehicle; and
   an Internet interface for communication of the local computer unit with at least one remote computer unit,
   wherein the at least one device is activated at least based on recorded global position data of at least one pedestrian and/or of at least one cyclist,
   wherein the position data of the at least one pedestrian and/or of the at least one cyclist are recorded, transmitted to the at least one remote computer unit and provided to the at least one local computer unit of the transportation vehicle,
   wherein the global position data of the at least one pedestrian and/or of the at least one cyclist are downloadable from the remote computer unit, or downloadable by the at least one local computer unit, and
   wherein the at least one local computer unit is connected to at least one control unit for activating the at least one lighting device and/or the at least one display device such that the at least one lighting device and/or the at least one display device is activatable based on downloaded global position data,
   wherein position data from the at least one pedestrian and/or cyclist are compiled in the remote computer unit and a location-dependent and time-dependent stopping history of pedestrians and/or cyclists is formed from these data.

10. The transportation vehicle of claim 9, wherein position and movement data of the at least one pedestrian and/or of the at least one cyclist are used by the transportation vehicle to direct a city light distribution onto that side of a roadway on which the pedestrian or the cyclist is situated.

11. The transportation vehicle of claim 9, wherein the position data of the at least one pedestrian and/or of the at least one cyclist are used by the transportation vehicle to mask a high beam distribution from the pedestrian or cyclist.

12. The transportation vehicle of claim 9, wherein the position data are compared using a navigation map.

13. The transportation vehicle of claim 9, wherein movement data are also recorded in addition to the position data and are used to estimate an expected movement trajectory of the at least one pedestrian and/or of the at least one cyclist, and a warning notification is output to the transportation vehicle driver and the at least one pedestrian or cyclist in response to it being expected that the movement trajectory of the at least one pedestrian and/or cyclist intersects a movement trajectory of the transportation vehicle.

* * * * *